United States Patent
Yamashita (10) Patent No.: US 12,199,484 B2
(45) Date of Patent: Jan. 14, 2025

(54) SLOT-LESS MOTOR

(71) Applicant: DENSO CORPORATION, Kariya (JP)

(72) Inventor: Yuuji Yamashita, Kariya (JP)

(73) Assignee: DENSO CORPORATION, Kariya (JP)

( * ) Notice: Subject to any disclaimer, the term of this patent is extended or adjusted under 35 U.S.C. 154(b) by 317 days.

(21) Appl. No.: 17/901,141

(22) Filed: Sep. 1, 2022

(65) Prior Publication Data

US 2022/0416604 A1    Dec. 29, 2022

Related U.S. Application Data (63) Continuation of application No. PCT/JP2021/001279, filed on Jan. 15, 2021.

(30) Foreign Application Priority Data

Mar. 6, 2020    (JP) ................................. 2020-039228

(51) Int. Cl.
  *H02K 3/47*    (2006.01)
  *H02K 3/12*    (2006.01)
  *H02K 3/28*    (2006.01)
  *H02K 21/22*   (2006.01)

(52) U.S. Cl.
  CPC ................ *H02K 3/28* (2013.01); *H02K 3/47* (2013.01); *H02K 21/22* (2013.01); *H02K 3/12* (2013.01)

(58) Field of Classification Search
  CPC .............. H02K 3/12; H02K 3/28; H02K 3/47
  See application file for complete search history.

(56) References Cited

U.S. PATENT DOCUMENTS

| | | | |
|---|---|---|---|
| 9,906,086 B2* | 2/2018 | Nakayama | B23K 10/02 |
| 2004/0004408 A1* | 1/2004 | Yamazaki | H02K 3/12 |
| | | | 310/184 |
| 2012/0293035 A1 | 11/2012 | Nakamura et al. | |
| 2015/0229175 A1* | 8/2015 | Miyashita | H02K 15/045 |
| | | | 310/43 |
| 2017/0179780 A1* | 6/2017 | Tsuiki | H02K 15/0037 |
| 2018/0013336 A1* | 1/2018 | Li | F04C 29/0085 |
| 2018/0034337 A1* | 2/2018 | Ishigami | H02K 3/46 |
| 2018/0367014 A1* | 12/2018 | Hashimoto | H02K 15/062 |
| 2019/0363596 A1 | 11/2019 | Takeuchi | |

* cited by examiner

*Primary Examiner* — Gary A Nash (74) *Attorney, Agent, or Firm* — Oliff PLC (57) ABSTRACT

A slot-less motor includes a rotor and a stator which is equipped with a coil assembly made of a combination of a plurality of coils. Each of the coils is designed as an air core coil which includes a pair of effective coil portions and a pair of coil ends. The coils assembly has the effective coil portions each of which is disposed in air cores of the respective adjacent coils. The coils include first coils each of which is not located between a center line and each of outer outlines of a respective adjacent one of the first coils.

6 Claims, 9 Drawing Sheets

COIL CONDUCTOR

SLOT-LESS MOTOR

CROSS REFERENCE TO RELATED DOCUMENT

The present application claims the benefit of priority of Japanese Patent Application No. 2020-039228 filed on Mar. 6, 2020 the disclosure of which is incorporated in its entirety herein by reference.

TECHNICAL FIELD

This disclosure in this application relates generally to a slot-less motor.

BACKGROUND ART

Patent literature 1 discloses a slot-less motor equipped with a stator. The stator includes a coil assembly made of a combination of a plurality of coils. Each of the coils of the coil assembly has a transverse section which extends perpendicular to an axial direction of the coil assembly and has a fan-shape. When the coil assembly is fabricated, the coils are moved relative to each other in the axial direction in order to avoid physical interference therebetween.

PRIOR ART DOCUMENT

Patent Literature

Patent Literature 1
International publication No. 2018/139245

SUMMARY OF THE INVENTION

In the fabrication of the above-described coil assembly, if a last one of the coils is attached to the other coils, which have been already assembled, from radially inside the other coils, it will result in physical interference of two or more of the other coils with the last coil, thereby making it impossible to complete the coil assembly.

It is an object of this disclosure to provide a slot-less motor which is equipped with an assembly of coils and designed to have a structure capable of attaching a last one (which will also be referred to below as a first coil) of the coils to the others from radially inside the others to complete the assembly of coils.

A slot-less motor according to the first embodiment of this disclosure comprises: (a) a rotor which includes permanent magnets and rotates around a rotational axis; and (b) a stator which includes a coil assembly made of a combination of a plurality of coils. Each of the coils is implemented by an air core coil which includes a pair of effective coil portions and a pair of coil ends disposed on axially opposed ends of the effective coil portions. The coil assembly has the effective coil portions of the coils which are arranged adjacent to each other in a circumferential direction. The coils include first coils each of which is not located between a coil center line and each of outer outlines of a respective adjacent one of the first coils. The coil center line is defined as a line passing through the center of the stator and the center of each of the coils. The outer outlines are defined as lines which extend parallel to the coil center line along circumferentially outer ends of the effective coil portions.

A slot-less motor according to the second embodiment of this disclosure comprises: (a) a rotor which includes permanent magnets and rotates around a rotational axis; and (b) a stator which includes a coil assembly made of a combination of a plurality of coils. Each of the coils is implemented by an air core coil which includes a pair of effective coil portions and a pair of coil ends disposed on axially opposed ends of the effective coil portions. The coil assembly is configured to have the effective coil portions arranged adjacent to each other in a circumferential direction with the effective coil portions of each of the coils being disposed in air cores of the adjacent coils. The coil ends of each of the coils are offset from those of the adjacent coils in a radial direction. The coils include first coils and second coils. The first coils have the coil ends arranged radially inside those of the second coils. A back-yoke is disposed radially outside the second coils. None of the first coils is located between a first coil center line and each of outer outlines of a respective adjacent one of the first coils. The first coil center line is defined as a line passing through the center of the stator and the center of each of the first coils. The outer outlines are defined as lines which extend parallel to the first coil center line along circumferentially outer ends of the effective coil portions of each of the first coils.

Each of the above structures enables a last one of the coils (i.e., the first coils) to be assembled with a combination of the other coils from radially inside such a combination.

BRIEF DESCRIPTION OF THE DRAWINGS

The above-described object, and other objects, features, or beneficial advantages in this disclosure will be apparent from the appended drawings or the following detailed discussion.

MODES FOR CARRYING OUT THE INVENTION

First Embodiment

The slot-less motor 100 according to the first embodiment of this disclosure will be described below.

Figure 1:
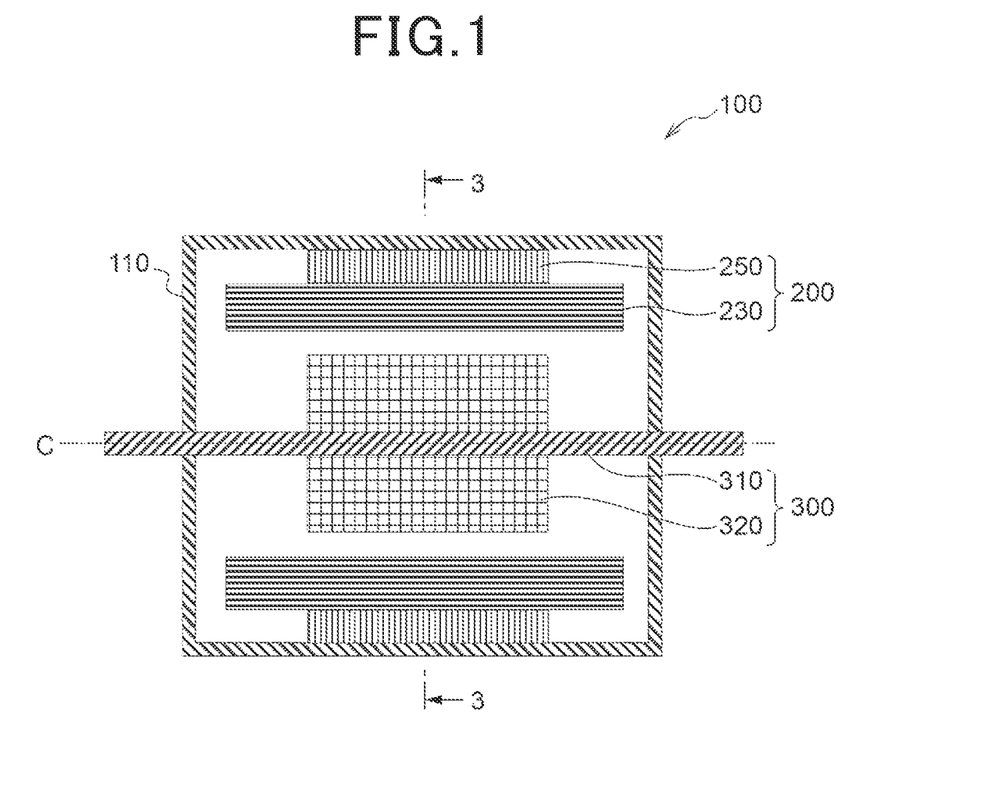
FIG. 1 is a schematic sectional view of a slot-less motor according to the first embodiment.

FIG. 1 is a sectional view which schematically illustrates the arrangement of parts of the slot-less motor 100.

The slot-less motor 100, as illustrated in FIG. 1, includes the case 110, the stator 200, and the rotor 300. The slot-less motor 100 is an inner-rotor motor having a radial gap structure.

In the following discussion, an axial direction represents a direction parallel to the center axis C of the rotor 300. A radial direction represents a direction perpendicular to the center axis C of the rotor 300, that is, a direction extending radially outward from the center axis C. A circumferential direction represents a direction centered at the center axis C of the rotor 300.

The rotor 300 includes the rotor shaft 310 and the permanent magnets 320. The rotor shaft 310 is rotatable around the center axis C. The permanent magnets 320 are disposed on an outer periphery of the rotor shaft 310. The rotor shaft 310 has ends retained by the case 110 to be rotatable.

The stator 200 is disposed in the case 110. The stator 200 includes the coil-back yoke 250 and the coil assembly 230. The coil assembly 230 is made of a combination of a plurality of coils 210 and 220. The coil-back yoke 250 is made of a magnetic material and of a cylindrical shape. The coil assembly 230 is secured to an inner periphery of the coil-back yoke 250.

Coil Assembly 230

Figure 2:
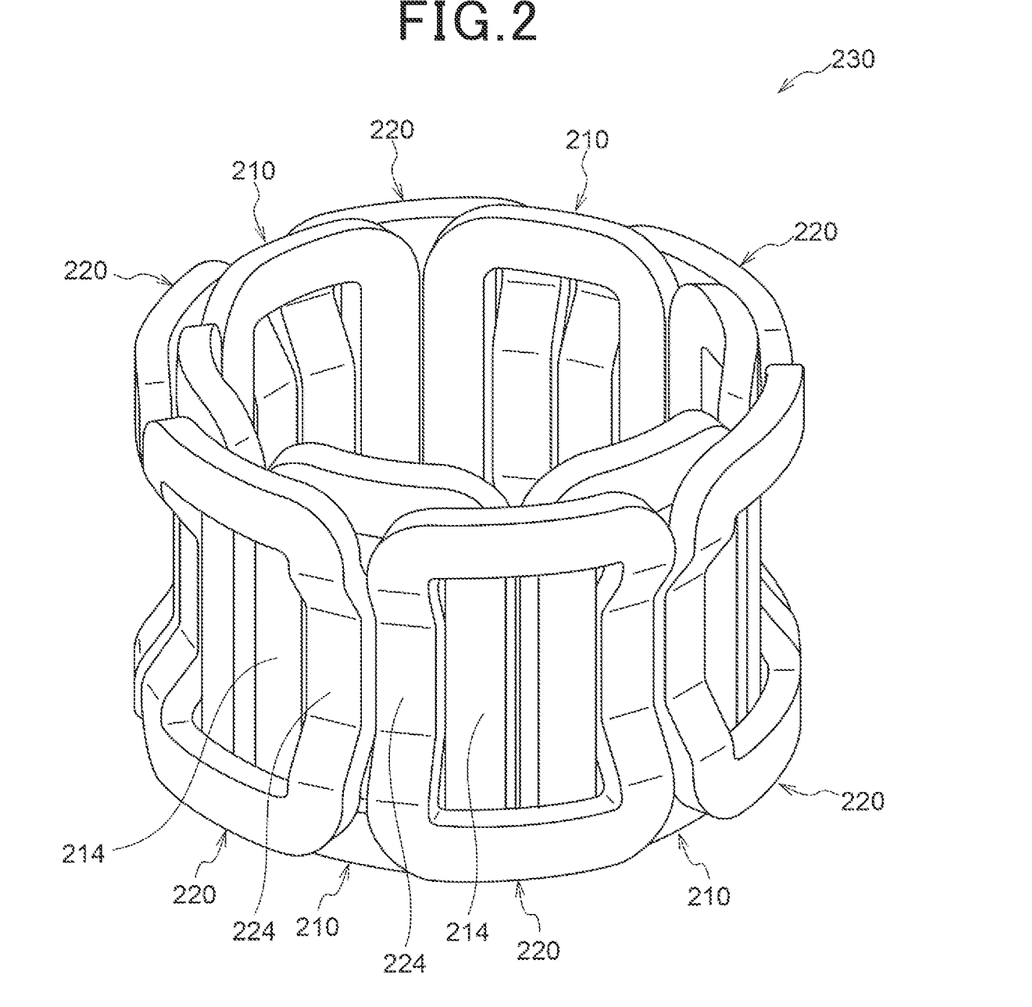
FIG. 2 is a perspective view which illustrates a coil assembly in the first embodiment.

FIG. 2 is a perspective view of the coil assembly 230.

The coils 210 and 220 of the coil assembly 230 include N first-shaped coils 210 and N second-shaped coils 220 where N is an integer more than or equal to two. In the illustrated example, N is six. The first-shaped coils 210 and the second-shaped coils 220 are different in configuration from each other. Each of the first-shaped coils 210 and the second-shaped coils 220 is covered with high-thermal conductive, high-insulating, and high-stiffness resin in the form of a mold. Conductors of the coils 210 and 220 are connected to a connector board, not shown.

The first-shaped coils 210 will also be referred to below as first coils. The second-shaped coils 220 will also be referred to below second coils.

Figure 4:
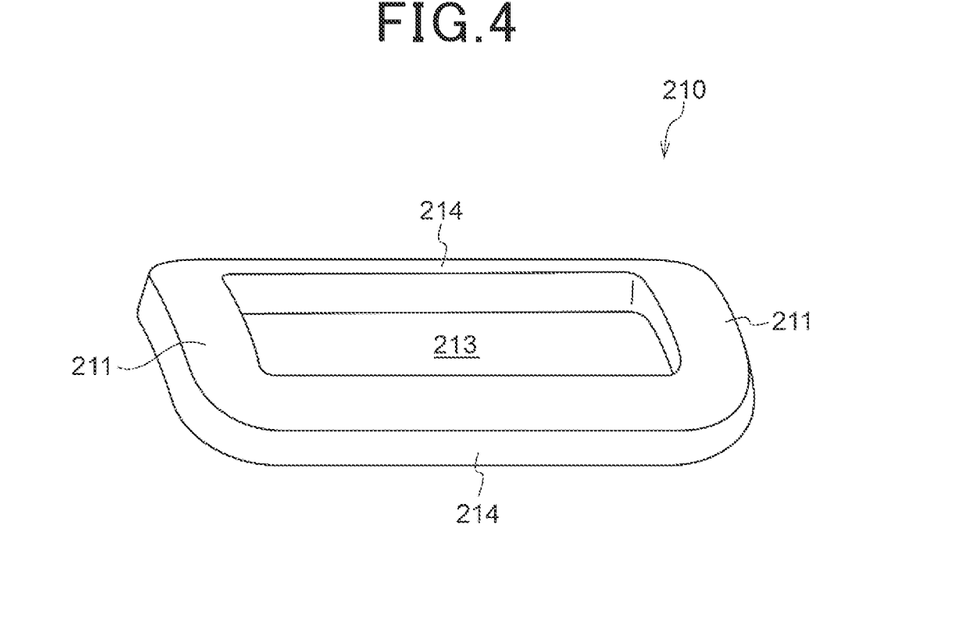
FIG. 4 is a perspective view which illustrates a first-shaped coil.
Figure 5:
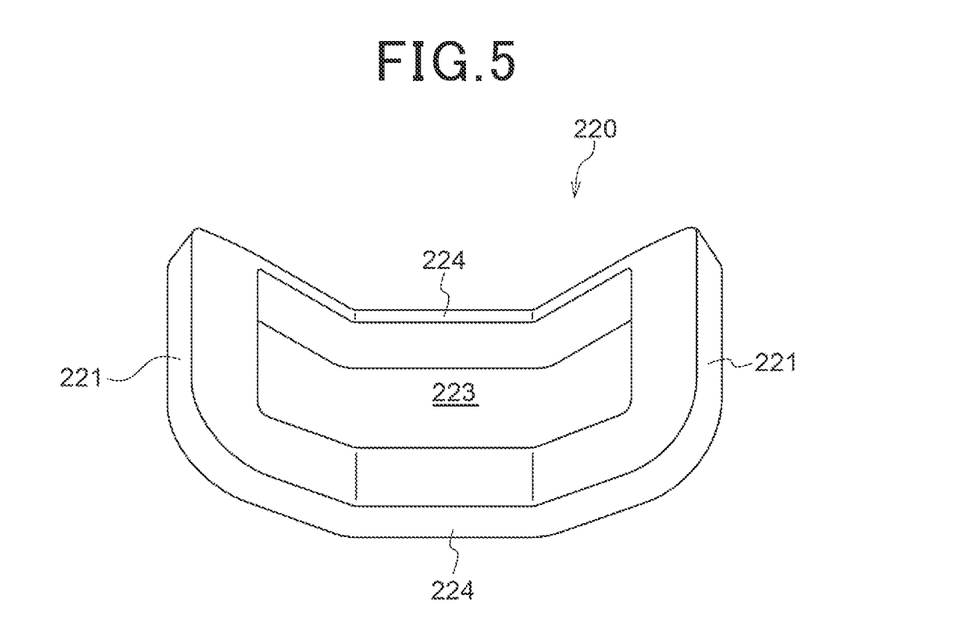
FIG. 5 is a perspective view which illustrates a second-shaped coil.

The first-shaped coils 210 and the second-shaped coils 220 are, as clearly illustrated in FIGS. 4 and 5, each designed in the form of an air core coil and have the air cores 213 and 223. Specifically, each of the first-shaped coils 210 includes a pair of effective coil portions 214 extending parallel to each other and a pair of coil ends 211 located on ends of the effective coil portions 214. Similarly, each of the second-shaped coils 220 includes a pair of effective coil portions 224 extending parallel to each other and a pair of coil ends 221 located on ends of the effective coil portions 224. The pair of effective coil portions 214 is made of a combination of two coil portions extending in the axial direction. Similarly, the pair of effective coil portions 224 is made of a combination of two coil portions extending in the axial direction. The paired effective coil portions 214 are arranged to define the air core 213 therebetween. The paired effective coil portions 224 are arranged to define the air core 223 therebetween. The coil-back yoke 250 faces the effective coil portions 214 and 224 in the radial direction.

The coil ends 211 of each of the first-shaped coils 210 are different in structure from the coil ends 221 of each of the second-shaped coils 220. Specifically, the coil ends 211 of each of the first-shaped coils 210 are located at the same position as the effective coil portions 214 in the radial direction, while the coil ends 221 of each of the second-shaped coils 220 are located outside the effective coil portions 224 in the radial direction. In other words, each of the second-shaped coils 220 has the bends 225 between the effective coil portions 224 and the coil ends 221, while each of the first-shaped coils 210 has no bends between the effective coil portions 214 and the coil ends 211.

The effective coil portions 214 of each of the first-shaped coils 210 are different in shape of a cross section (i.e., a transverse cross section extending perpendicular to the axial direction) from the effective coil portions 224 of each of the second-shaped coils 220 in a way which will be described later in detail.

The coil assembly 230 is fabricated by preparing and arranging the N second-shaped coils 220 and then attaching the first-shaped coils 210 to the N second-shaped coils 220 from radially inside the N second-shaped coils 220. The assembly of the coils 210 and 220 is achieved by firmly bonding radially outer surfaces of the effective coil portions 214 and 224 of the coils 210 and 220 to a radially inner surface of the cylindrical coil-back yoke 250.

Figure 3:
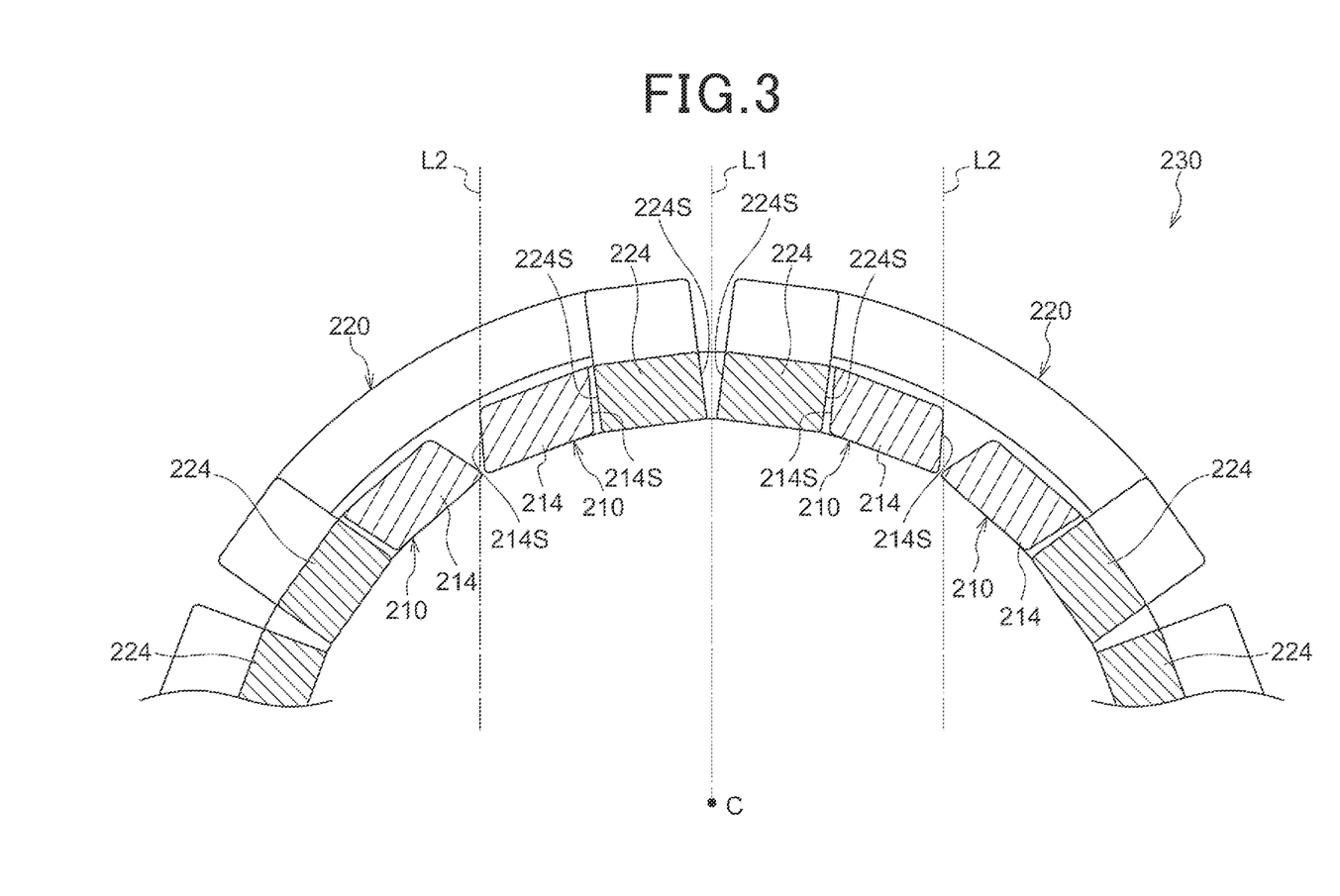
FIG. 3 is an enlarged sectional view, as taken along a line perpendicular to an axial direction, which illustrates a coil assembly in the first embodiment.

FIG. 3 is a sectional view of the coil assembly 230, i.e., an enlarged sectional view which illustrates the effective coil portions 214 and 224. The coil assembly 230, as can be seen in FIG. 3, has the air core 213 of each of the first-shaped coils 210 (see FIG. 4) in which the effective coil portions 224 of the second-shaped coils 220 are disposed. The coil assembly 230 also has the air core 223 of each of the second-shaped coils 220 (see FIG. 5) in which the effective coil portions 214 of the first-shaped coils 210 are disposed. In this way, the effective coil portions 214 of the first-shaped coils 210 and the effective coil portions 224 of the second-shaped coils 220 are arranged adjacent to each other in the circumferential direction. In other words, the effective coil portions 214 of the first-shaped coils 210 and the effective coil portions 224 of the second-shaped coils 220 do not overlap each other in the radial direction.

The coil ends 211 of the first-shaped coils 210, as can be seen in FIG. 2, overlap with the coil ends 221 of the second-shaped coils 220. The coil ends 211 of the second-shaped coils 220 are arranged radially outside of the coil ends 211 of the first-shaped coils 210.

Cross Sectional Shape of Effective Coil Portion

The effective coil portions 214 of the first-shaped coils 210, as clearly illustrated in FIG. 3, have parallelogram transverse sections. The effective coil portions 224 of the second-shaped coils 220 have rectangular transverse sections. Such configurations minimize air gaps among four effective coil portions: the paired effective coil portions 214 of each of the first-shaped coils 210 and the coil portions 224 of a respective adjacent two of the second-shaped coils 220 which are disposed in the air core 213 of the corresponding first-shaped coil 210.

Specifically, the effective coil portions 214 of each of the first-shaped coils 210 have the side surfaces 214S extending parallel to the coil center line L1 of a corresponding one of the first-shaped coils 210. The coil center line L1, as referred to herein, is a straight line passing through the center of the stator 200 (coinciding with the rotational axis C) and the center of each of the coils 210 and 220.

Operation of Beneficial Advantage of this Embodiment

The operation and beneficial advantages of this embodiment will be described below.

The slot-less motor 100 in this embodiment includes the rotor 300 and the stator 200. The rotor 300 is equipped with the permanent magnets 320 and rotates around the rotational axis C. The stator 200 is equipped with the coil assembly 230 made of a combination of the coils 210 and 220. The coils 210 and 220 are, as described above, each designed in the form of an air core coil. Each of the coils 210 includes the paired effective coil portions 214 and the paired coil ends 211 located on the ends of the effective coil portions 214. Similarly, each of the coils 220 includes the paired effective coil portions 224 and the paired coil ends 221 located on the ends of the effective coil portions 224. The effective coil portions 214 and 224 of the coils 210 and 220 are arranged adjacent each other in the circumferential direction. The effective coil portions 214 of each of the coils 210 are disposed in the air cores 223 of a respective adjacent two of the coils 220. The effective coil portions 224 of each of the coils 220 are disposed in the air cores 213 of a respective adjacent two of the coils 210. Each of the coil ends 211 of the coils 210 is offset from a respective adjacent one of the coil ends 221 of the coils 220 in the radial direction.

If the first-shaped coils 210 which have the coil ends 211 located radially inside the coil ends 221 of the second-shaped coils 220 will be referred to as the first coils 210, and the second-shaped coils 220 which have the coil ends 221 located radially outside the coil ends 211 will be referred to as the second coils 220, each of the first coils 210 is not located between the coil center line L1 and each of outer outlines L2 of a respective adjacent one of the first coils 210. The outer outlines L2, as referred to herein, are straight lines which extend parallel to the coil center line L1 along circumferentially outer ends of the effective coil portions 214 or 224. This enables the coil assembly 230 to be fabricated by securing a last one of the first coils 210 to a combination of the other first coils 210 having already assembled from radially inside that combination. This is because there is no physical interference of the last first coil 210 with the other first coils 210 when the last first coil 210 is moved along the coil center line L1 and secured to the other first coils 210.

Figure 6:
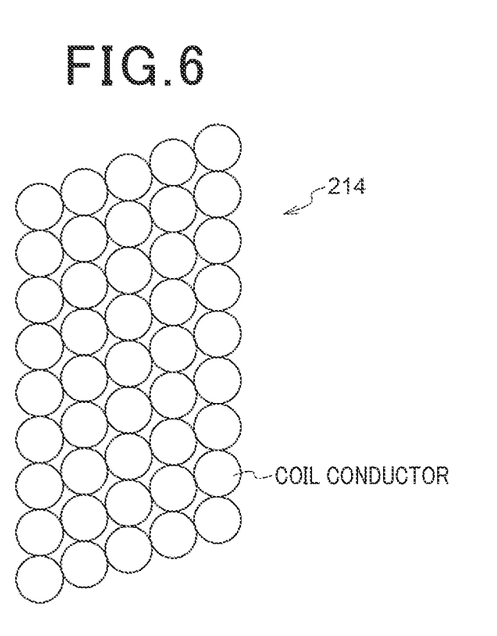
FIG. 6 is a view which demonstrates an arrangement of a coil conductor in a transverse section of a coil effective portion of a first-shaped coil.
Figure 7:
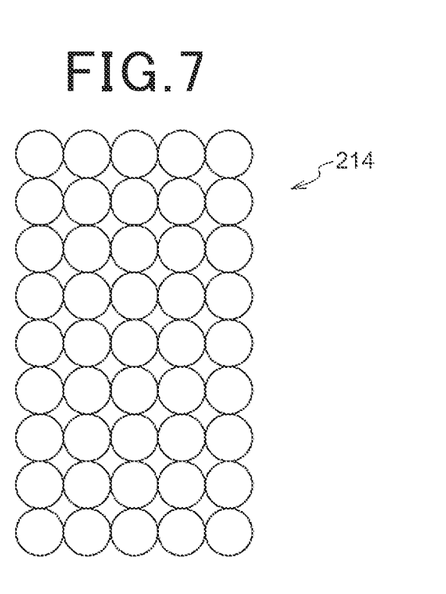
FIG. 7 is a view which demonstrates an arrangement of a coil conductor in a transverse section of a coil effective portion of a second-shaped coil.
Figure 8:
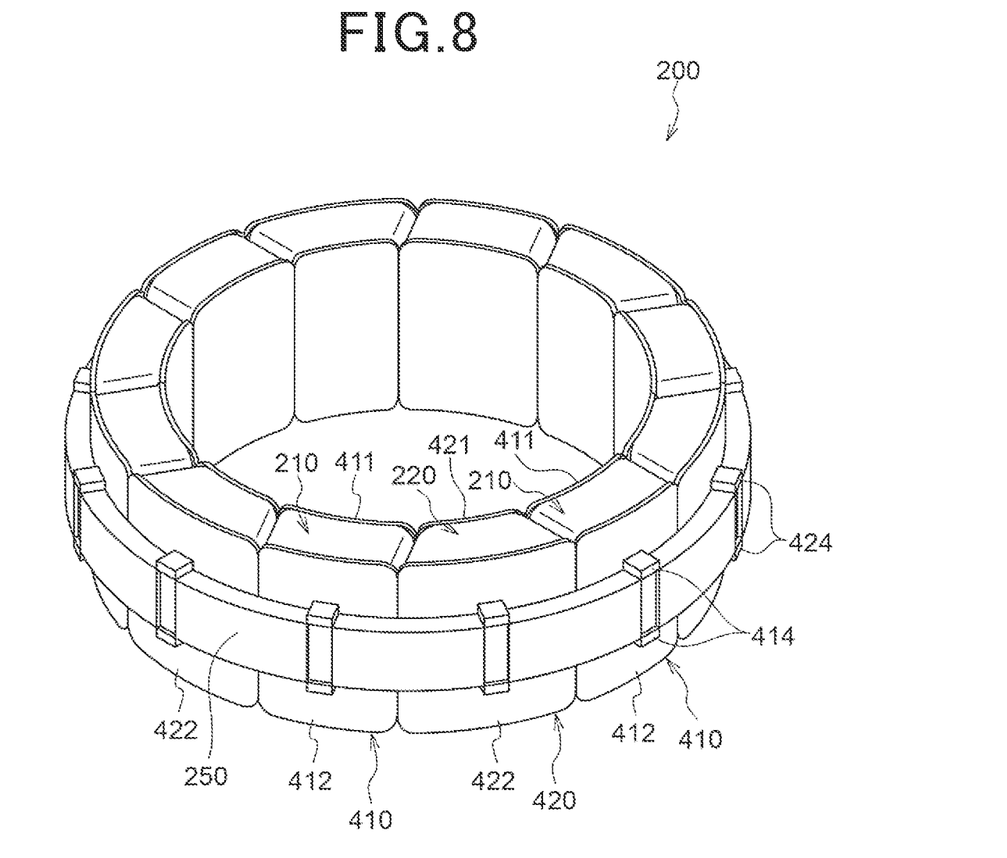
FIG. 8 is a perspective view which illustrates a stator of a slot-less motor according to the second embodiment.
Figure 9:
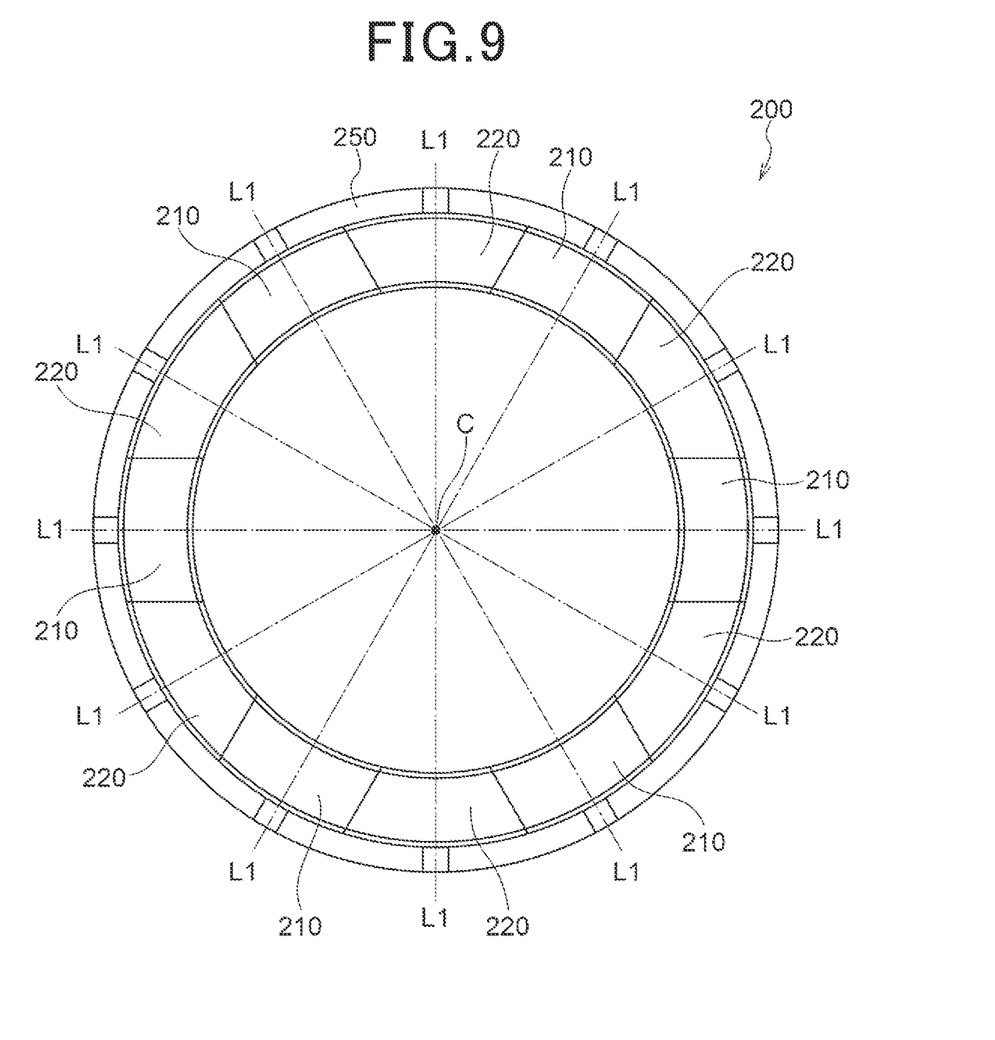
FIG. 9 is a view which illustrates a stator of a slot-less motor according to the second embodiment, as viewed in an axial direction of the stator.
Figure 10:
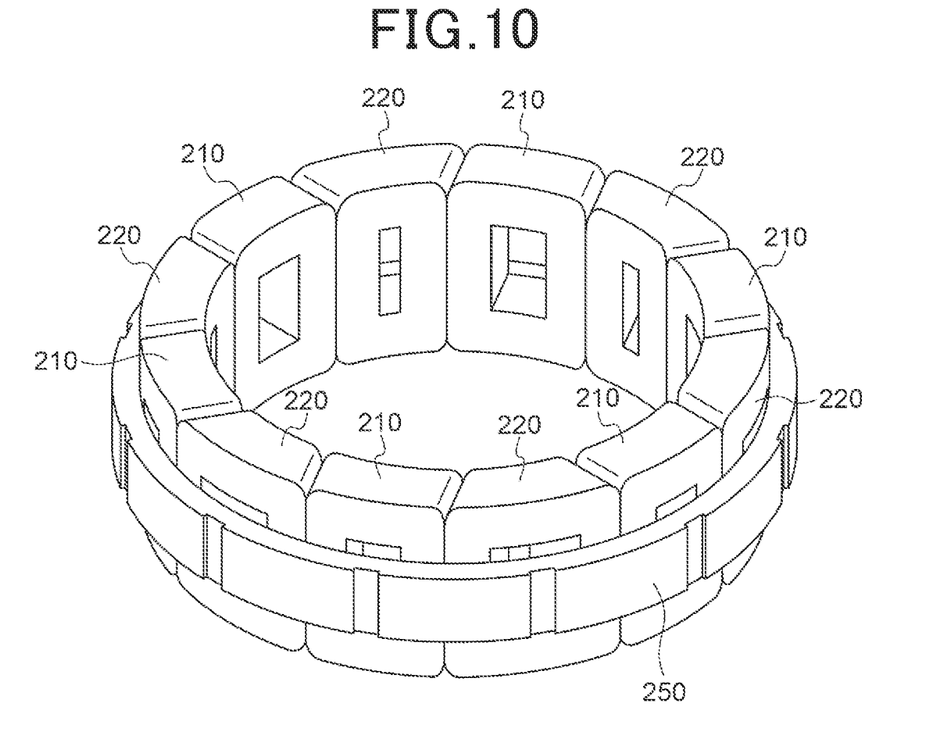
FIG. 10 is a perspective view which shows the structure in FIG. 8 from which a housing is omitted.

Each of the effective coil portions 214 and 224 is shaped to have a parallelogram transverse section, thereby facilitating the ease with which the effective coil portions 214 and 224 are arranged to have a high space factor (also called stacking factor). This is because the parallelogram transverse sections enable conductors of the coils 210 and 220 to be arranged uniformly within cross sections of the coils 210 and 220. This will be described below with reference to FIGS. 6 and 7. In a case where a given number (e.g., five) of conductors are arranged along each line extending in a lateral direction in FIGS. 6 and 7, and a given number (e.g., nine) of conductors are arranged along each line extending in a vertical direction in FIGS. 6 and 7, the parallelogram shape of the transverse section of each of the effective coil portions 214 enables the conductors to be arranged uniformly within the transverse section thereof. The term "parallelogram", as referred to therein, contains the rectangular shape.

The transverse sections of the effective coil portions 214 of each of the first-shaped coils 210 are of a parallelogram with deeper angles, in other words, more acute and obtuse opposite angles than the effective coil portions 224 of the second-shaped coils 220. This results in a decreased size of an air gap between each of the effective coil portions 214 of the first-shaped coils 210 and a circumferentially adjacent one of the effective coil portions 224 of the second-shaped coils 220. The term parallelogram with deeper angles, as referred to herein, represents a parallelogram shape where an absolute value of 90°−θ is greater where θ is each interior angle of the parallelogram.

Supplemental Explanation of First Embodiment

The first embodiment refers to the second-shaped coils 220 with the effective coil portions 224 whose transverse sections are rectangular, but however, the effective coil portions 224 may be designed to have transverse sections of a parallelogram shape other than rectangular or a trapezoidal shape. For instance, the effective coil portions 224 of the second-shaped coils 220 disposed in the air cores 213 of the first-shaped coils 210 have the side surfaces 224S which may be shaped to extend parallel to the coil center line L1 of the first-shaped coils 210. Alternatively, the side surfaces 214S of the effective coil portions 214 of the first-shaped coils 210 and the side surfaces 224S of the effective coil portions 224 of the second-shaped coils 220 disposed in the air cores 213 of the first-shaped coils 210 may be all designed to extend parallel to the coil center line L1 of the first-shaped coils 210.

Second Embodiment

A slot-less motor according to the second embodiment will be described below with reference to FIGS. 8 to 11.

The coils 210 and 220 of the coil assembly 230 include N first-shaped coils 210 and N second-shaped coils 220 where N is an integer more than or equal to two. In the illustrated example, N is six. The first-shaped coils 210 and the second-shaped coils 220 are different in configuration from each other.

The first-shaped coils 210 will also be referred to below as first coils. The second-shaped coils 220 will also be referred to below second coils.

Each of the first-shaped coils 210 includes a pair of effective coil portions 214 extending parallel to each other and a pair of coil ends 211 located on ends of the effective coil portions 214. Similarly, each of the second-shaped coils 220 includes a pair of effective coil portions 224 extending parallel to each other and a pair of coil ends 221 located on ends of the effective coil portions 224. The pair of effective coil portions 214 is made of a combination of two coil portions extending parallel to the center axis C of the rotor 300. Similarly, the pair of effective coil portions 224 is made of a combination of two coil portions extending parallel to the center axis C of the rotor 300. The paired effective coil portions 214 are arranged to define the air core 213 therebetween. The paired effective coil portions 224 are arranged to define the air core 223 therebetween.

The first-shaped coils 210 are produced by winding conductors around the respective housings 410 made from synthetic resin. Similarly, the second-shaped coils 220 are produced by winding conductors around the respective housings 420. Each of the housings 410 includes the inner plate 4111, the outer plate 412 and the bobbin 413 around which the conductor is wound. Each of the housings 420 includes the inner plate 421, the outer plate 422, and the bobbin 423 around which the conductor is wound. Each of the inner plates 411 and 421 and the outer plates 412 and 422 has arc-shaped surfaces which are curved to be centered at the center axis C of the stator 200, as viewed in the axial direction. Each of the bobbins 413 connects between a corresponding one of the inner plates 411 and a corresponding one of the outer plates 421. Similarly, each of the bobbins 423 connects between a corresponding one of the inner plates 421 and a corresponding one of the outer plates 422. The bobbins 413 and 423 are located in the air cores 213 and 223, respectively.

Each of the housings 410 also includes a pair of protrusions 414 which protrude radially outward from the outer plate 412. Similarly, each of the housings 420 also includes a pair of protrusions 424 which protrude radially outward from the outer plate 422. The protrusions 414 of each of the housings 410 are aligned with each other in the axial direction. Similarly, the protrusions 424 of each of the housings 420 are aligned with each other in the axial direction. The coil-back yoke 250 is disposed between the adjacent pairs of the protrusions 414 and 424.

The first housings 410 for the first-shaped coils 210 and the second housings 420 for the second-shaped coils 220 are different in configuration from each other. This causes the effective coil portions 214 and 224 of the first-shaped coils 210 and the second-shaped coils 220 to have transverse cross sections, as taken in a direction perpendicular to the axial direction, which are different in shape from each other.

Coil Assembly 230

The coil assembly 230 is fabricated by preparing and arranging the N second-shaped coils 220 and then assembling the first-shaped coils 210 with the N second-shaped coils 220 from radially inside the N second-shaped coils 220. The first-shaped coils 210 and the second-shaped coils 220 are arranged adjacent to each other alternately in the circumferential direction. The N coils 210 and the N coils 220 are disposed radially inside the cylindrical coil-back yoke 250.

Cross Sectional Shape of Effective Coil Portion

Figure 11:
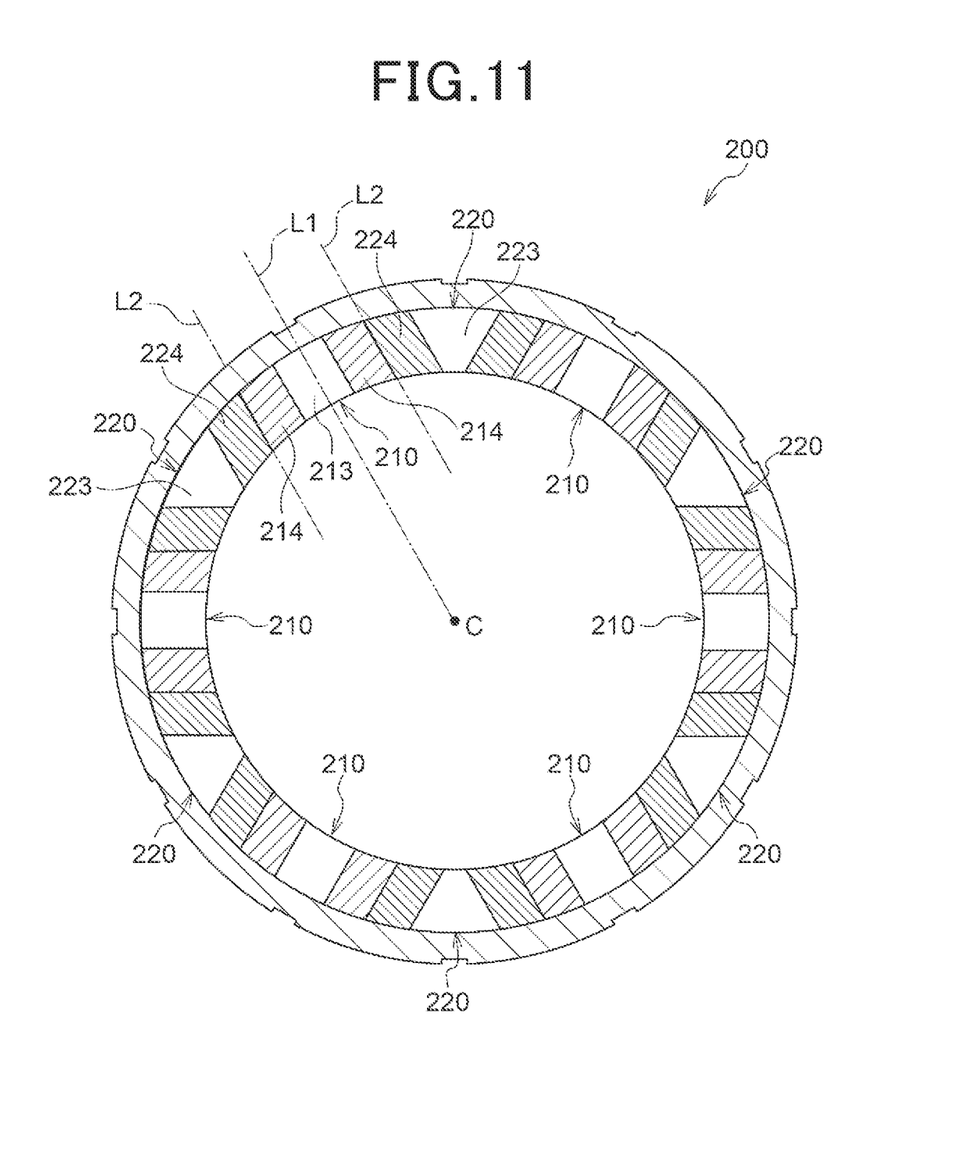
FIG. 11 is a sectional view of a stator, as taken along a line perpendicular to an axial direction, from which the housing in FIG. 10 is omitted.

The effective coil portions 214 of the first-shaped coils 210, as clearly illustrated in FIG. 11, have parallelogram transverse sections. Similarly, the effective coil portions 224 of the second-shaped coils 220 have parallelogram transverse sections.

Specifically, the effective coil portions 214 of each of the first-shaped coils 210 have the side surfaces 214S extending parallel to the coil center line L1 of a corresponding one of the first-shaped coils 210. The effective coil portions 224 of each of the second-shaped coils 220 have side surfaces 224S which extend parallel to the coil center line L1 of a respective adjacent one of the first-shaped coils 210. This causes the transverse sections of the effective coil portions 224 of each of the second-shaped coils 220 to be of a parallelogram with angles deeper than those of the transverse sections of the effective coil portions 214 of the first-shaped coils 210.

Operation of Beneficial Advantage of this Embodiment

Next, operations and beneficial advantages of this embodiment will be described below.

In this embodiment, the coils 210 and 220 are, as described above, each designed in the form of an air core coil. Each of the coils 210 includes the paired effective coil portions 214 and the paired coil ends 211 located on the axially opposed ends of the effective coil portions 214. Similarly, each of the coils 220 includes the paired effective coil portions 224 and the paired coil ends 221 located on the axially opposed ends of the effective coil portions 224. The effective coil portions 214 and 224 of the coils 210 and 220 of the coil assembly 230 are arranged adjacent each other in the circumferential direction.

If the number of the coils 210 and 220 is defined as 2N, there are N center lines L1 which are located at equal intervals away from each other, pass through the center axis C of the stator 200 and the centers of the coils 210 and 220, and extend parallel to the outer lines L2 (see FIG. 11) that are straight lines extending parallel to the center line L1 along circumferentially outer ends of the effective coil portions 214 or 224. Between each of the center lines L1 of the coils 210 and 220 and the adjacent outer outlines L2, only a respective one of the first-shaped coils 210 is disposed. This enables the coil assembly 230 to be fabricated by arranging the first coils 210 in place in a combination of the second coils 220, as having already assembled together, from radially inside that combination. This is because there is no physical interference of each of the first coils 210 with the other coils 210 and 220 when each of the first coils 210 is moved along the center line L1 and arranged in place in a combination of the other coils 210 and 220.

The effective coil portions 214 and 224 in this embodiment are each designed to have a parallelogram transverse section, thereby facilitating the ease with which the effective coil portions 214 and 224 are arranged to have a high space factor (also called stacking factor).

The transverse sections of the effective coil portions 224 of each of the second-shaped coils 220 in this embodiment are of a parallelogram with deeper angles than those of the effective coil portions 214 of the first-shaped coils 210. This results in a decreased size of an air gap between each of the effective coil portions 214 of the first-shaped coils 210 and a circumferentially adjacent one of the effective coil portions 224 of the second-shaped coils 220. The term parallelogram with deeper angles, as referred to herein, represents a parallelogram shape where an absolute value of 90°−θ is greater than another parallelogram where θ is each interior angle of the parallelogram. Particularly, the effective coil portions 214 of the first-shaped coils 210 and the effective coil portions 224 of the second-shaped coils 220 are shaped to have circumferentially opposing surfaces extending parallel to each other. Such a parallel orientation is useful for decreasing the size of an air gap between each of the effective coil portions 214 of the first-shaped coils 210 and a circumferentially adjacent one of the effective coil portions 224 of the second-shaped coils 220.

The side surfaces 214S of the effective coil portions 214 of each of the first-shaped coils 210 and the side surfaces 224S of the effective coil portions 224 of the adjacent second-shaped coils 220 are shaped to extend parallel to the center line L1 of a corresponding one of the first-shaped coils 210, thereby resulting in decreased sizes of air gaps therebetween and preventing the opposing angles of the parallelogram transverse section of each of the effective coil portions 214 and 224 from being made deeper undesirably.

Supplemental Explanation of Second Embodiment

The second embodiment has referred to the second-shaped coils 220 with the effective coil portions 224 whose transverse sections are of a parallelogram shape, but however, the effective coil portions 224 may be designed to have transverse sections of a trapezoidal shape.

Each of the above embodiments has referred to an inner-rotor electrical-mechanical device in which a rotor is disposed in a coil assembly, but however, it may be used with an outer-rotor electrical-mechanical device in which a rotor is arranged outside a coil assembly.

While the preferred embodiments have been disclosed in order to facilitate better understanding of this disclosure, it should be appreciated that the disclosure can be embodied in various ways without departing from the principle of the disclosure. Therefore, the disclosure should be understood to include all possible embodiments and modifications to the shown embodiments which can be embodied without departing from the principle of the disclosure as set forth in the appended claims.

What is claimed is:

1. A slot-less motor comprising:
   a rotor which includes permanent magnets (320) and rotates around a rotational axis; and
   a stator which includes a coil assembly made of a combination of a plurality of coils, wherein
   each of the coils is implemented by an air core coil which includes a pair of effective coil portions and a pair of coil ends disposed on axially opposed ends of the effective coil portions, the coil assembly has the effective coil portions of the coils which are arranged adjacent to each other in a circumferential direction, and the coils include first coils each of which is not located between a coil center line and each of outer outlines of a respective adjacent one of the first coils, the coil center line being defined as a line passing through the center of the stator and the center of each of the coils, the outer outlines being defined as lines which extend parallel to the coil center line along circumferentially outer ends of the effective coil portions.

2. The slot-less motor as set forth in claim 1, wherein each of the effective coil portions has a parallelogram transverse cross section.

3. The slot-less motor as set forth in claim 1, wherein the coils also include second coils disposed adjacent to the first coils, the effective coil portions of each of the second coils having transverse cross sections which are of a parallelogram shape with angles deeper than those of transverse cross sections of the effective coil portions of the first coils.

4. A slot-less motor comprising:
 a rotor which includes permanent magnets (320) and rotates around a rotational axis; and
 a stator which includes a coil assembly (230) made of a combination of a plurality of coils, wherein
 each of the coils is implemented by an air core coil which includes a pair of effective coil portions and a pair of coil ends disposed on axially opposed ends of the effective coil portions, the coil assembly is configured to have the effective coil portions arranged adjacent to each other in a circumferential direction with the effective coil portions of each of the coils being disposed in air cores of the adjacent coils, the coil ends of each of the coils being offset from those of the adjacent coils in a radial direction, and the coils include first coils and second coils, the first coils having the coil ends arranged radially inside those of the second coils, a back-yoke being disposed radially outside the second coils, each of the first coils is not located between a first coil center line and each of outer outlines of a respective adjacent one of the first coils, the first coil center line being defined as a line passing through the center of the stator and the center of each of the first coils, the outer outlines being defined as lines which extend parallel to the first coil center line along circumferentially outer ends of the effective coil portions of each of the first coils.

5. The slot-less motor as set forth in claim 4, wherein each of the effective coil portions has a parallelogram transverse cross section.

6. The slot-less motor as set forth in claim 4, wherein the effective coil portions of each of the first coils have transverse cross sections which are of a parallelogram shape with angles deeper than those of transverse cross sections of the effective coil portions of second coils.

* * * * *